Nov. 12, 1946.　　　　　O. H. LUCY　　　　　2,410,888
METHOD AND APPARATUS FOR MOLDING THREE-DIMENSIONAL
SHAPES FROM DRAWINGS
Filed March 31, 1944　　　　4 Sheets-Sheet 2.

INVENTOR.
Otto H. Lucy
BY
Atty.

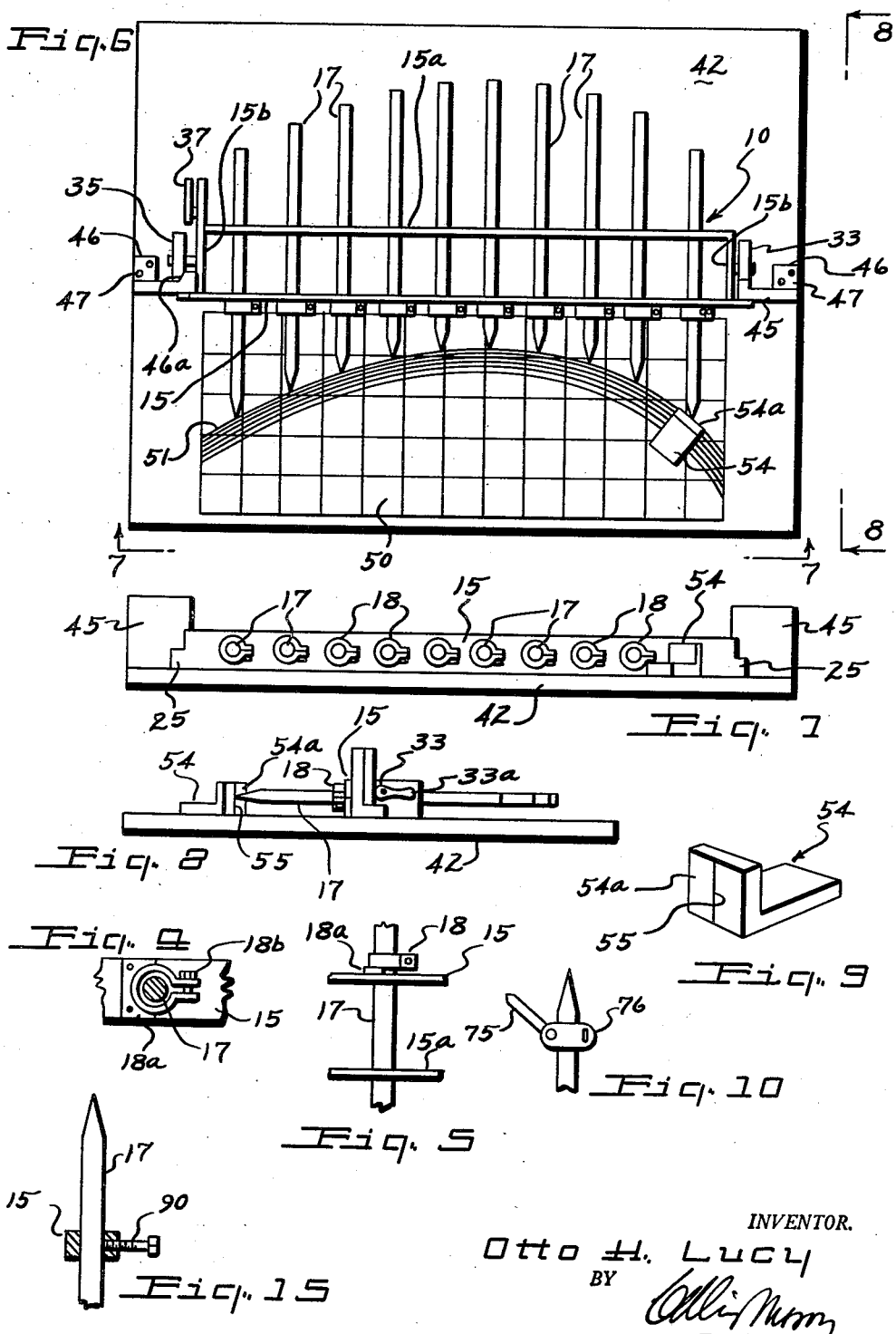

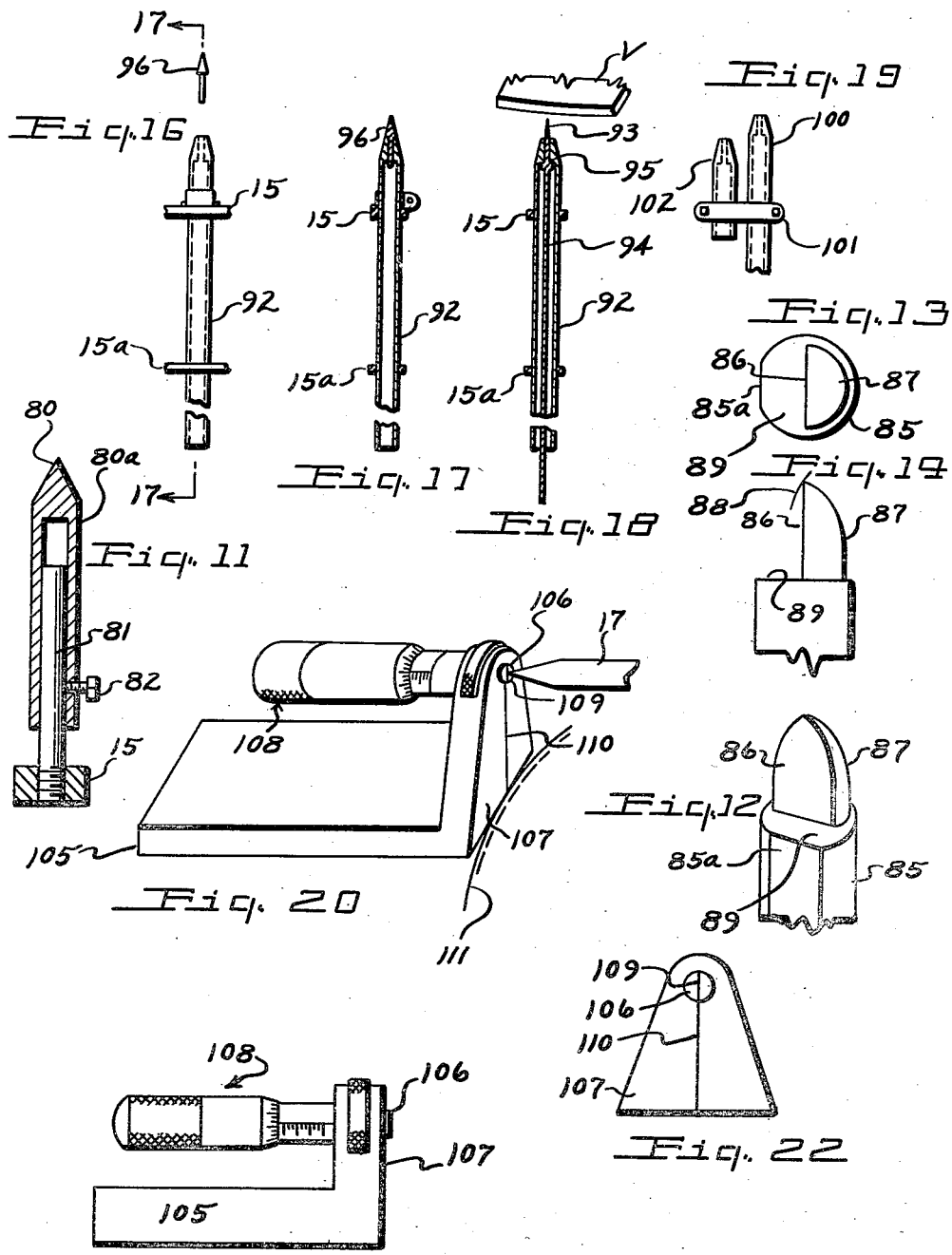

Patented Nov. 12, 1946

2,410,888

UNITED STATES PATENT OFFICE 2,410,888

METHOD AND APPARATUS FOR MOLDING THREE-DIMENSIONAL SHAPES FROM DRAWINGS

Otto H. Lucy, Los Angeles, Calif., assignor to Murray-Lucy-Marvosh Company, Pasadena, Calif., a partnership Application March 31, 1944, Serial No. 529,033

17 Claims. (Cl. 25—118)

This invention has to do with the art of producing shapes or contours and has for one of its objects the developing and producing of any desired contour or shape without the use of conventional templates.

It is another object of my invention to provide apparatus for transferring flat drawings or reference lines to three-dimensional shapes.

Another object of the invention is to provide novel apparatus for producing a shape and providing in the produced shape reference indicia to be subsequently employed as a finishing guide and for other checking purposes.

Another object is to provide method and apparatus for producing from flat drawings three-dimensional shapes which conform in contour to the drawings with extreme accuracy.

Another object is to provide in such apparatus means for providing the shape with a base which may be employed as a reference for checking and measuring layout work in relation thereto.

My invention has still further objects and corresponding advantages, the nature and identity of which will become apparent to those skilled in the art from the following detailed description of a presently preferred embodiment which I have chosen for purposes of explanation. In this connection, however, I wish it understood that my invention, in its broader aspects as defined by the appended claims, is not to be confined to the details and association of parts now to be particularly described, since it is capable of being practiced in other modified forms of apparatus which the following description will suggest to those working in the art.

For purposes of the ensuing description I shall refer to the accompanying drawings, in which:

Fig. 4 is an enlarged section taken on line 4—4 of Fig. 3;

Fig. 5 is an enlarged fragmentary view showing, in side elevation, one of the contour-defining pins;

Fig. 6 is a top plan view showing the setting element;

Fig. 7 is a view taken on line 7—7 of Fig. 6;

Fig. 8 is a view taken on line 8—8 of Fig. 6;

Fig. 9 is a perspective view showing a setting block;

Fig. 10 is a fragmentary view showing a modified form of contour-defining pin, in side elevation;

Fig. 11 is a fragmentary section showing another modified form of contour-defining pin;

Figs. 12, 13 and 14 are perspective, side elevation and end views, respectively, showing a further variational form of contour-defining pin;

Fig. 15 is a fragmentary view of a modified form of pin-locking means;

Figs. 16 and 17 are side elevation and longitudinal sectional views, respectively, of a further variational form of contour-defining pin;

Fig. 18 is a view similar to Fig. 17 showing a drill disposed axially of the pin;

Fig. 19 is a still further variational form of pin; and

Figs. 20, 21 and 22 are perspective, side elevation and end elevations, respectively, showing a modified form of setting block.

Figure 1:
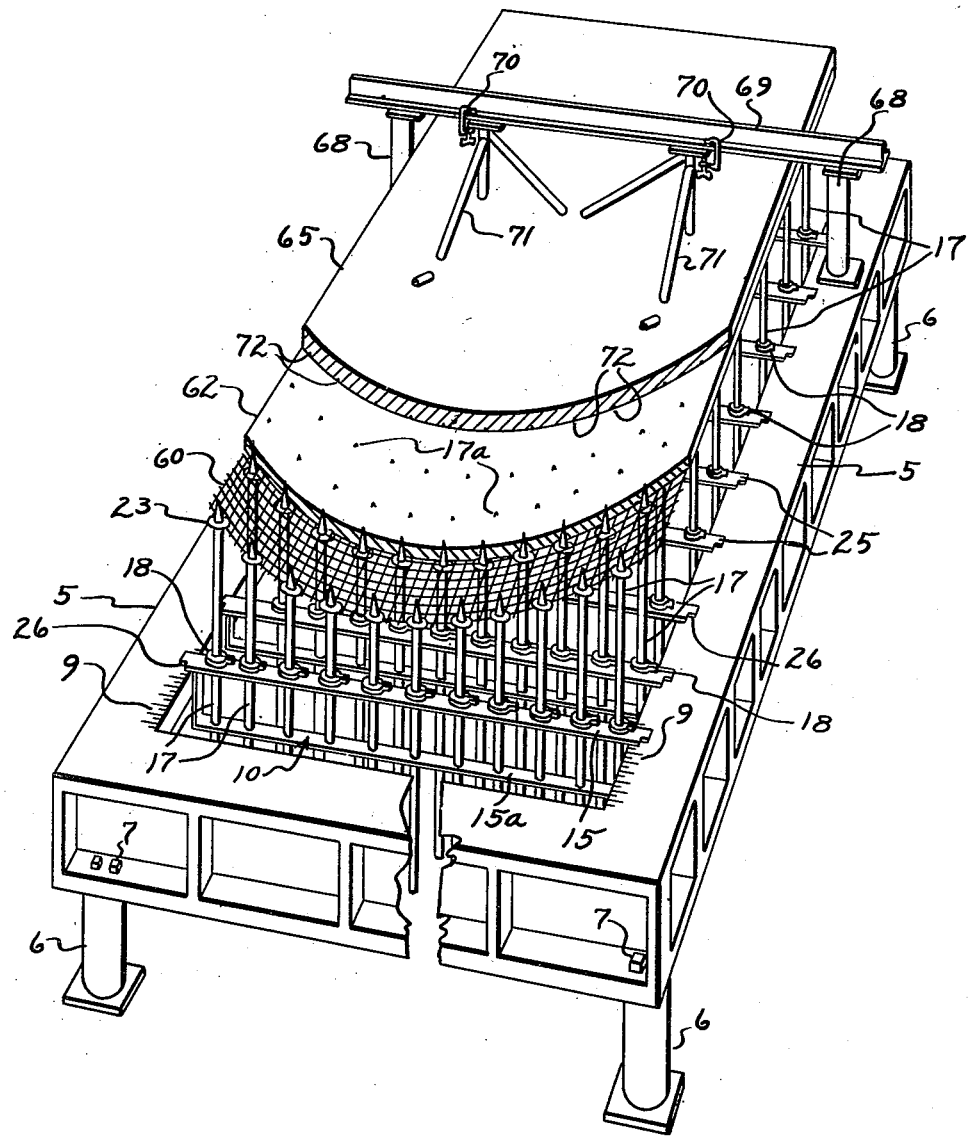
Fig. 1 is a perspective of my apparatus with a matrix and a shape disposed thereon, some parts being broken away for illustrative purposes.

Referring now to the drawings, I show a body or frame providing channeled side members 5. The frame is here illustrated as being of metal, cast in one integral piece, but, of course, may be composed of separate frame members suitably assembled. The frame is supported upon corner legs 6 which may be secured to the frame as by dowels 7.

Along the top surface, adjacent the inner edge, of each of the sides 5, I provide a scale of calibrations 9, here shown as being formed into the sides although, of course, the scale may be otherwise applied.

A plurality of pin-retaining contour transferring elements or frames generally designated at 10 are disposed in parallel relationship transversely between the sides 5.

Each of the elements 10 consists of a rectangular frame having a top bar 15 and a bottom bar 15a secured together by end members 15b. Spaced pairs of registering holes 16 are provided through the bars 15, 15a and through each pair of registering holes a contour-defining pin or spike 17 adjustably extends. Each of the pins is adapted to be clamped in any set position relative to the bars by means of a clamp collar 18 secured to the top bar by an attaching flange 18a (Fig. 4). Each collar is split and is adapted to be clamped about a pin as by a screw 18b.

The top end of each of the pins or spikes 17 tapers to a point as shown at 17a, and a washer 23 may be loosely placed over the pointed end so as to be rockable thereon whenever necessary to accomplish the proper contour as will be hereinafter explained.

The ends of the top bars 15 have extensions 25 resting on the sides 5 and the inner edge 26 of each of the extensions is alined with the longitudinal axis of the openings 16 and the pins 17. Thus the edge 26, when registered with the scale 9, permits the operator to accurately aline the axes of the pins with the desired indicia on the scales 9.

Figure 3:
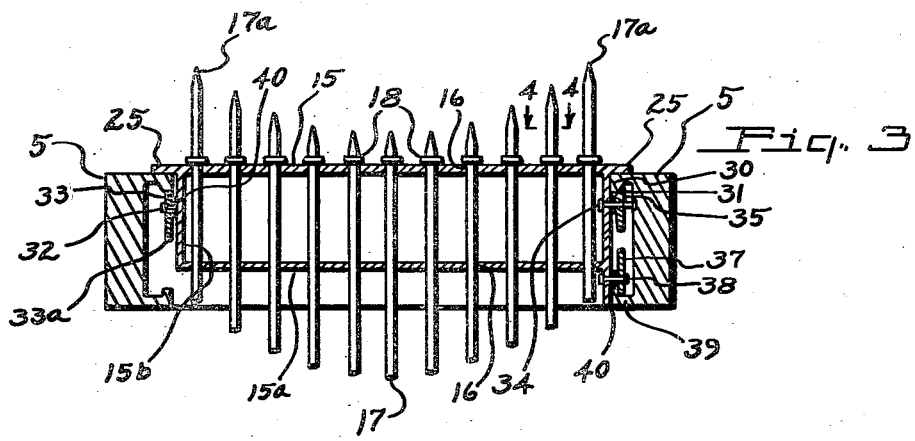
Fig. 3 is a section on line 3—3 of Fig. 2.

As best shown in Fig. 3, each of the side members 5 has a depending flange 30 whose inner side surface 31 is beveled. To the left-hand end 15b of each frame I pivotally secure, as by a pin 32, an eccentric clamp 33 having a handle portion 33a, which clamp eccentrically engages the undersurface of the depending flange on the left-hand frame member 5 to positively retain the bar extension 25 against the top surface of the side 5. To the right-hand end 15b of each frame, I pivotally secure, as by a pin 34, an eccentric clamp 35 whose inner side face is beveled to cooperate with the beveled surface 31 of the flange 30, so as not only to hold the extension 25 in engagement with the top surface of the right-hand frame member 5, but also to pull the right-hand end 15b of the frame into engagement with the flange 30. Since the frames 10 fit between the sides 5 with sufficient looseness to permit of free insertion and removal, this cooperation of clamp 35 with the beveled surface 31 insures uniform positioning of all the frame elements 10 between the sides 5. To prevent swinging of the elements 10 relative to the sides 5, I provide a third eccentric clamp 37 pivotally secured to an extension of one of the ends 15b for eccentric clamping engagement with the upper surface of a flange 39 provided on the side 5. Spacers 40 may be provided between the ends 15b and the clamps 33, 35, 37.

It will be observed that the several top bars 15 of the frames 10 are thus disposed in a common plane on the sides 5 and the pointed ends of the pins are adjusted relative to that plane. Before mounting the frames 10, with their carried pin elements, between the sides 5, the pins 17 are adjusted so that their pointed ends register with the respective contour lines of a flat drawing to be followed, and in Figs. 6, 7 and 8 I show what I term the setting table for accomplishing this adjustment. Here I show a table or flat plate 42 which oppositely disposed angle iron guide brackets 45 secured thereto adjacent its opposite side edges by their attaching flanges 46 and bolts 47. I show one of the frames 10 with its carried pins laid flatly against the table, with the bar extensions 25 bearing against the front faces of the guide brackets. The frame is secured in position by the clamp 33 engaging the adjacent face of one of the guide brackets and by the beveled clamp 35 engaging the beveled adjacent surface 46a of the other guide bracket, which cooperating beveled surfaces draw the left-hand end 15b of the frame against the left-hand guide bracket 45.

The drawing or "loft" to be followed, here denoted by the numeral 50, is placed flatly against the table 42 under the adjacent pointed ends of the pins 17. First the clamp screws 18b of the collars are loosened so that the pins may be adjusted axially through the collars. A contour line to be followed on the drawing is denoted by the numeral 51.

Figure 2:
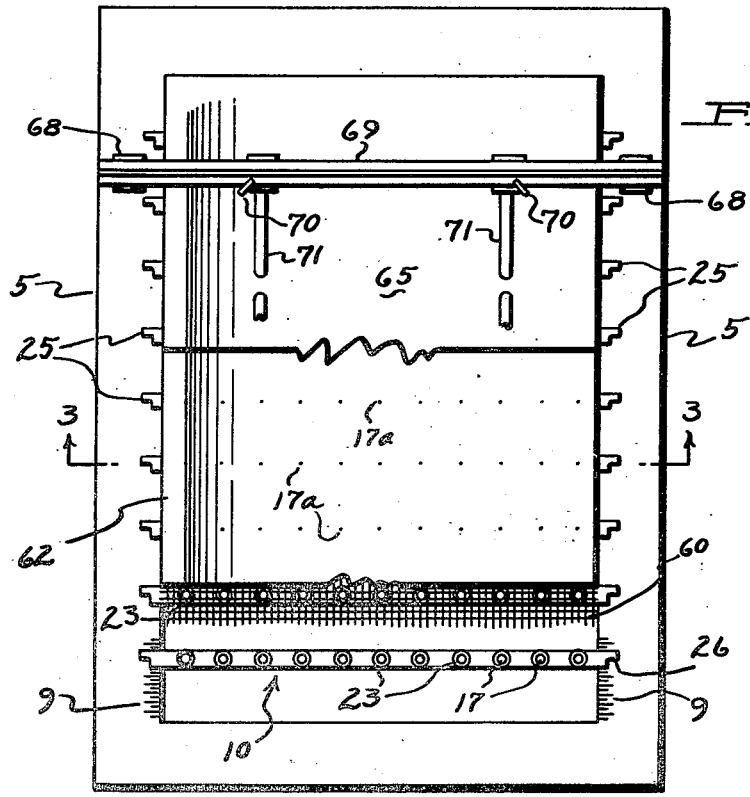
Fig. 2 is a top plan view.

A setting block 54, here shown as an angle iron, is placed loosely on the face of the drawing 50 so that it may be freely, manually moved from a position opposite one pin end to a position opposite another pin end. The front face 54a of the setting block is adapted to be registered with the contour line 51 and disposed normal to the drawing. As shown in Fig. 9, the front face of the block 54 has a perpendicular reference line 55 with which the pointed ends of the respective pins 17 are brought into contact when the block is registered with the contour line 51 at the end of the pin being set, to thereby register the pin end with the line. As each pin 17 is thus set in the desired position relative to the contour line, the clamp screw 18b of the collar 18 is tightened to secure that pin in the set position, and the block 54 is manually moved to the next adjacent pin and the same setting procedure is there followed. This pin-setting procedure continues until all the pins 17 of a given frame 10 are set and secured at the desired position, after which the frame 10 is removed from the table 42 and placed between the sides 5 as shown in Figs. 1 and 2, with the bar extension edges 26 registering with the appropriate reading of the scales 9, which correspond to the relative position of the contour line on the drawing with which those pins have been coordinated.

Then a different contour line on the drawing 50 is used for the setting of the pins of the next frame and this procedure is followed until there is a frame 10 in position between the sides 5 corresponding to all the desired contour lines on the drawing. Thus, when the pins and frames are positioned as shown in Fig. 1, the pointed ends of the pins 17 collectively define the contour of the shape which it is desired to produce.

Next the washers 23, which function as stop guides and supports, are placed loosely over the pointed ends of the pins and a matrix is mounted thereon. First, in forming the matrix, I place a sheet of pliant screen wire 60 over the pointed ends of the pins 17 and force the screen down against the washers 23, thus conforming it to the contour defined by the pins. Next a matrix sheet 62, such as a sheet of pliant modeling clay, is formed over and conformed to the screen, the sheet 62 being forced over the pointed ends of the pins until the points of the pins project above the top surface of the sheet 62 to a slight extent, of the order of $\frac{1}{32}$ inch. The extent of this projection is determined by the extent of final finishing which it is desired to perform on the shape to be formed on the matrix.

Before forming the final shape 65 to be described, I provide a suitable base-locating structure for the shape by placing on the sides 5 a pair of height blocks 68 upon the tops of which I rest a straight edge 69. To the straight edge I secure, as by c-clamps 70, leg members 71 whose free ends are disposed in position spaced slightly above the matrix surface so as to become embedded in the shape 65 when the latter is formed.

Next the material of which the shape 65 is to be formed—which typically may be plaster-of-Paris or other suitable plastic—is poured or otherwise applied over the matrix 62 and allowed to set or harden, the free ends of the legs 71 becoming embedded in the shape. For some materials it may be desirable to first coat the matrix 62 with a suitable mold-release material.

After the shape 65 has set, it is removed from the matrix. Its outer surface will have small depressions 72 formed by the protruding ends of the pin 17, and the bottoms of those depressions delineate the final outer surface of the shape. Thus in finally finishing and polishing the shape, the finisher will remove the surface material to the depth of the depression, which depressions serve as a guide not only for the final finishing operation, but also enable the finisher to check the contour against the original contour drawing.

If no such final finishing work is to be done on the set shape, the pointed ends of the pins should terminate flush with or short of the top surface of the matrix sheet 62 so as not to form depressions on the shape.

In Fig. 10 I show a modified form of pin 17 which is as before described except that I here employ an auxiliary spike 75 pivotally mounted on a collar 76 secured on the pin. Spike 75 affords additional support for the matrix intermediate adjacent pins 17.

In Fig. 11 I show a further variational form of contour-defining pin 80 having a tubular shank 80a axially adjustably mounted on a pin 81, which latter may be rigidly attached to the bar 15 of a frame element 10. A set screw 82, or other suitable locking means, may be employed to retain the pin in adjusted position.

In some cases, particularly where the pins are being coordinated to contour lines of relatively small radius, to obtain extreme accuracy it may be necessary to employ objectionably long tips on the spikes. In Figs. 12, 13 and 14 I show a modified form of pin which overcomes this necessity, and also may eliminate the stop washers 23. Here the shank of the spike 85 has a longitudinally flattened portion 85a which prevents rotation of the spike relative to the carrying bar when fitted in a hole in the bar which has like cross-sectional shape. The top, pointed end of the spike is axially split to provide a flat face 86 and a spherical portion 87. Thus the tip may be accurately registered with the contour line 88 of a drawing (see Fig. 14) regardless of the length of the tip end. The relatively increased diameter of the shank portion provides an annular stop shoulder 89 for the matrix.

In Fig. 15 I show a pin or spike mounting which eliminates the necessity of the clamp collar 18 before described. Here I merely employ a set screw 90 threadedly mounted in a lateral hole in the bar 15, the inner end of the screw being adapted to engage the pin 17 to secure the latter against axial movement.

While I have described the forming of a plastic matrix, my apparatus may be used to form veneer matrices. In Figs. 16–18 I show a modified type of contour-defining pin 92 axially adjustably disposed in frame members 15, 15a as before described. Here, however, the pin is tubular and frustum shaped at its top end. First a hole is drilled in the veneer V by inserting a drill 93 through the frustum of the pin and rotating the drill as by a flexible shaft 94. The drill has a stop shoulder 95 to limit the depth of the drilled hole. After each hole is drilled, the drill is removed and a tip member 96 is inserted in the axial hole through the frustum, which tip member engages in the hole in the veneer previously made by the drill.

In Fig. 19 I show a further modified form of pin 100 which is like that of Figs. 16–18 except that it has mounted thereon, as by a bracket 101, an auxiliary pin 102 which is likewise adapted for drilling and to receive a tip member 96.

In forming some shapes it may be desirable to allow, in the setting of the contour-defining pins, for a springback of the shape after it is removed from the matrix, or it may be desired to set the pins to define a contour of a slightly different radius than that of the line of the drawing being followed. In Figs. 20–22 I show a modified form of setting block 105 by which such allowances or variations may be simply made. Here, instead of the fixed contact face on the block to be engaged by the pin being set, as before described, I employ a micrometer adjustment wherein the micrometer plunger 106 may be moved outwardly or inwardly relative to the front face 107 of the block by the conventional micrometer mechanisms 108. The plunger 106 is non-rotatable and has a line 109 registering with the perpendicular center line 110 on the front face of the block. Thus when line 110 is registered with the contour line 111 of the flat drawing, the relative setting of the pin 17 may be varied to any measured extent by axially moving plunger 106.

I claim:

1. Apparatus for forming shapes comprising, in combination, a plurality of pins adapted to have their adjacent ends adjusted into positions coordinate with a contour line of a drawing whereby collectively to define the contour of said line, setting means for so adjusting said pins, pin-retaining means securing the pins in assembly in said adjusted position and a matrix made of sheet material formed to a shape substantially conforming to the contour line defined by said adjacent ends of the pins, the pin ends being positioned to project above an upper surface portion of the matrix surrounding the pin ends.

2. Apparatus for forming shapes comprising, in combination, a plurality of rows of pins, the pins of each row being adapted to have their adjacent ends adjusted into positions coordinate with a contour line of a drawing whereby collectively to define the contour of said line, a plurality of separate pin-retaining members, each of said members securing the pins of a row in adjusted position, a body providing means supporting said separate pin-retaining members in a common plane and in assembled position whereby the adjacent ends of the pins of the several rows collectively define a composite shape, and a matrix supported on said adjacent ends of the pins of the several rows and conforming to said defined composite shape, the pin ends projecting from a molding surface of the matrix.

3. In a support for a molding matrix, a frame having sides, a removable cross member having a planiform side support portion, said cross member being supported at its respective ends by the respective sides, a plurality of upright pins axially adjustably carried by and spaced apart along the cross member, said pins presenting upper tip portions collectively defining a contour, locking means carried by the cross member for locking engagement with the pins, and a matrix support element adjacent the upper end of each pin whereby the cross member is adapted to be removed from the frame and supported on its side support parallel to a planiform drawing of a contour line, and the pins adjusted to have an end portion of each positioned directly above a point of the contour line thereby collectively to define a contour line similar to that of the drawing.

4. Apparatus for forming shapes, comprising a frame having sides, a cross member supported at its respective ends by the respective sides, a plurality of pins carried by and spaced apart along the cross member, said pins presenting end portions collectively defining a contour, and a matrix mounted upon said end portions of the pins and shaped in conformance with said contour, said matrix being adapted to receive an unset plastic material.

5. Apparatus for forming a shape, comprising a frame having sides, a cross member supported at its respective ends by the respective sides, a plurality of pins carried by and spaced apart along the cross member, said pins presenting end portions collectively defining a contour, a matrix mounted upon said end portions of the pins and shaped in conformance with said contour, said matrix being retained by the pins in fixed position to retain an unset plastic material until the material sets to produce a shape conforming to said contour, and means for retaining a base for the shape, consisting of a cross bar and means supporting the cross bar in position spaced above the form.

6. In apparatus for forming shapes, a frame having sides, one of said sides presenting a depending longitudinal flange having a beveled outer side surface, a cross member extending between the sides and having end portions resting on the top surface of the sides, an eccentric clamp rotatably carried by the cross member and having a beveled inner side surface engageable with the beveled surface of the flange.

7. In a support for a molding matrix, a body having sides, a removable cross frame having spaced upper and lower bars, said cross frame normally being disposed transversely between the sides and having a planiform side support portion, aligned spaced pairs of registering openings through the upper and lower bars, contour-defining pins adjustably mounted in the respective pairs of openings, clamp means on the cross frame releasably lockably engaging the pins, said pins having pointed upper ends collectively defining a contour, means for locking the cross frame in adjusted position between the sides, and a matrix support element carried by the pins in downwardly spaced relation from the contoured tips thereof.

8. Apparatus for forming shapes, comprising, in combination, a plurality of bars, a plurality of contour-defining pins carried by and disposed transversely of each bar, the pins of each bar being axially movable relative to said bar whereby their tips may be moved into adjusted positions relative to the bar, means for locking the pins in such adjusted position, body means supporting the several bars in a common plane for horizontal adjustment relative to each other, and a pliant shape-forming matrix supported on and conforming to the shape defined by the tip ends of the pins, the pin ends penetrating the matrix to locate a molding surface of the matrix with respect to the pin ends.

9. Shape-forming apparatus comprising a base providing spaced side members, bars supported in spaced parallel relationship between the side members, a plurality of pins carried by and spaced apart longitudinally of each bar, said pins having tapering tip end portions collectively defining a contour, and a shape-forming matrix mounted on the tapered end portions of the pins, the extreme tip end portions of the pins projecting through the top surface of the matrix whereby to form guide recesses in a shape formed on the matrix.

10. In shape-forming apparatus, a matrix shaped coordinate with contour lines of a drawing, said matrix being adapted to receive an unset shape-forming plastic, indicia-forming means projecting through the matrix surface to form guide indicia on the shape, said means being adjustable whereby to be positioned coordinate with the contour lines of the drawing.

11. In shape-forming apparatus, a matrix shaped coordinate with contour lines of a drawing, said matrix being adapted to receive an unset shape-forming plastic, indicia-forming means projecting from the matrix surface to form guide depressions in the shape, said means being axially adjustable whereby to be adapted to be positioned coordinate with the contour lines of the drawing.

12. The method of using pins and a matrix to form a three-dimensional shape in conformance with a flat contour line drawing, which comprises: assembling the pins with their tip ends coordinate with the contour line of the drawing, forming the matrix on and in conformance with the contour defined by said tip ends of the pins and applying an unset plastic to the matrix.

13. The method of using spikes and a matrix to form a three-dimensional shape in conformance with a flat contour line drawing which comprises: assembling the spikes with their pointed ends coordinate with the contour line of a drawing, placing the matrix onto and in conformance with the contour defined by the pointed ends of the spikes and applying an unset plastic to the matrix.

14. The method of using spikes and a matrix to form a three-dimensional shape in conformance with a flat contour line drawing which comprises: assembling the spikes with their pointed ends coordinate with the contour line of a drawing, placing the matrix onto and in conformance with the contour defined by the pointed ends of the spikes until the pointed ends of the spikes project above the surface of the matrix and applying an unset plastic to the matrix.

15. Apparatus for forming shapes comprising a plurality of pins each having a longitudinal bore adapted to pass a drill, means for adjustably securing the pins in relative axially adjusted position defining a contour, a pointed tip member carried by each of the pins, each of the tip members having a shank portion engaging in the bore of the pin by which it is carried, and a matrix supported on and retained by the tip members in position conforming to the shape defined thereby.

16. In shape-forming apparatus a plurality of indicia-forming points arranged to define a contoured shape, means supporting the points in arranged position, and a matrix shaped substantially coordinate with the contoured shape defined by the points, at least some of the points projecting from a molding surface of the matrix, said matrix being adapted to receive and mold an unset shape-forming plastic with the projecting indicia-forming points extending into the plastic to form guide indicia in the molded shape.

17. The method of molding a shape by using pins and a deformable molding matrix comprising so assembling the pins that their tip ends are relatively disposed to define a contour, providing a matrix support below the contour defined by the pin tip ends, deforming the matrix downwardly with respect to the pin tip ends onto the matrix support, with the pin tip ends projecting from a contour defined by a molding surface of the matrix, and applying an unset moldable plastic to the matrix.

OTTO H. LUCY.